US012267143B2

(12) United States Patent
Cleverly

(10) Patent No.: US 12,267,143 B2
(45) Date of Patent: Apr. 1, 2025

(54) SYSTEMS AND METHODS FOR FACILITATING DETECTION OF BASEBAND SIGNALS IN RADIO-FREQUENCY COMMUNICATION

(71) Applicant: Northwood Space Corp., Somerville, MA (US)

(72) Inventor: Griffin Cleverly, Somerville, MA (US)

(73) Assignee: Northwood Space Corp., Somerville, MA (US)

( * ) Notice: Subject to any disclaimer, the term of this patent is extended or adjusted under 35 U.S.C. 154(b) by 0 days.

(21) Appl. No.: 18/386,052

(22) Filed: Nov. 1, 2023

(65) Prior Publication Data
US 2024/0146386 A1    May 2, 2024

Related U.S. Application Data

(60) Provisional application No. 63/421,388, filed on Nov. 1, 2022.

(51) Int. Cl.
*H04B 7/10*    (2017.01)
*H04B 1/707*   (2011.01)

(52) U.S. Cl.
CPC .............. *H04B 7/10* (2013.01); *H04B 1/707* (2013.01)

(58) Field of Classification Search
CPC .......... H04B 7/10; H04B 1/707; H04B 7/086; H04J 13/0022
See application file for complete search history.

(56) References Cited

U.S. PATENT DOCUMENTS

| 7,327,775 B1* | 2/2008 | Gu | H04B 1/707 375/140 |
| 8,396,096 B2* | 3/2013 | Noel | H04B 1/707 375/147 |
| 10,367,595 B1 | 7/2019 | Hu et al. | |

FOREIGN PATENT DOCUMENTS

EP    3011684 A1    4/2016

OTHER PUBLICATIONS

Gautier M et al: "New antenna diversity front-end using code multiplexing", 3rd European Conference on Antennas and Propagation. EUCAP 2009 , Mar. 23-27, 2009—Berlin, Germany, IEEE, Piscataway, NJ, USA, Mar. 23, 2009 (Mar. 23, 2009), pp. 1052-1056, XP031469970, ISBN: 978-1-4244-4.

(Continued)

*Primary Examiner* — Kabir A Timory

(57) ABSTRACT

A system for communicating radio-frequency (RF) signals includes a receiver subsystem that employs a phased antenna array, and signal spreading of the respective responses of the elements of the phased antenna array. The codes used for spreading are unique to each antenna element. The spread signals are combined and analog-to-digital conversion (ADC) is applied to the combined spread signal. The signals to be spread may be grouped according to a signal characteristic such as signal polarization or whether the signal is an in-phase or quadrature signal. A respective signal combiner and a respective ADC may be used for each group. The communication system may include a transmission subsystem that employs signal de-spreading that is unique for each antennal element.

5 Claims, 5 Drawing Sheets

(56) References Cited

OTHER PUBLICATIONS

International Search Report and Written Opinion for International Patent Application PCT/US23/36591 mailed on Apr. 18, 2024; 27 pages.
Notification of the International Application Number and of the International Filing Date for International Patent Application PCT/US23/36591 mailed on Nov. 28, 2023; 1 page.

* cited by examiner

SYSTEMS AND METHODS FOR FACILITATING DETECTION OF BASEBAND SIGNALS IN RADIO-FREQUENCY COMMUNICATION

CROSS-REFERENCE TO RELATED APPLICATIONS

This patent application claims priority to and benefit of a U.S. Provisional Patent Application No. 63/421,388, filed on Nov. 1, 2022 and titled "Method of Multiplexing Multiple Satellite Signals in Radio Frequency Front End," the entire contents of which are incorporated herein by reference.

FIELD

The present disclosure is related to the field of radio-frequency (RF) communication, and more particularly, to techniques that can improve the efficiency of RF communication systems and methods employing beam forming.

BACKGROUND

A signal emitted from an antenna generally emits in many directions. Likewise, an antenna can generally receive from several directions a transmitted signal. While this may be useful in some situations, in some other situations, the lack of signal transmission/reception in a particular direction can be an impediment. For example, in communications from/to a ground antenna to/from a satellite it is typically desirable that the signal be transmitted/received in a particular direction, e.g., the direction that directly connects the ground antenna and the satellite. The direction of a signal to be transmitted/received generally means that a significant portion of the signal energy propagate in a direction designated as the direction of the signal.

This can be achieved using a phased antenna array, instead of a single antenna, transmission/reception. A phased antenna array includes several antenna elements (AEs). For signal transmission, each antenna element (AE) transmits a copy of the signal to be transmitted, but with a respective time or phase delay. Likewise, for signal reception, each AE receives a transmitted signal and generates a respective response signal, where each response signal is associated with a respective time/phase delay. By controlling the time/phase delays (generally referred to as phases) of the AEs, the direction of the signal to be transmitted/received by the phased antenna array can be controlled. The gains of each antenna element may also be controlled.

A phased antenna array can be an analog array, a digital array, or a hybrid array, which is a combination of an analog and a digital array. One advantage of a digital phased antenna array is that generally the phases and/or the gains of the individual AEs can be changed on demand more easily than making such changes in an analog array. This may be particularly beneficial in a receiving antenna when the direction of the signal to be received is not known. In this case, several sets of copies of each response signal of each AE are made, and different phases and/or gains may be explored with different sets, to determine which particular phase and/or gains identify the direction of the signal to be received. Copying an analog signal often results in some signal loss and degradation. In contrast, a digital signal can be copied without loss and signal degradation. Thus, determining the phase and/or gains can be less error prone, and potentially faster if parallel processing of the signal copies is employed, in a digital phased array antenna.

The above described advantage generally comes at a significant cost, however. In a digital phased array antenna, prior to copying and processing of the respective response signals from the AEs in the array, each response signal is digitized via analog-to-digital conversion (ADC). Generally, the signal received at the array, and the corresponding AE response signals, are RF signals, where the signal frequency can be tens or hundreds of megahertz or a few gigahertz. The ADC of these signals is performed at least at the Nyquist rate, which is two-times the maximum signal frequency, and often at even higher rates. As such, each ADC, which may occur at a high frequency of several megahertz or at gigahertz, can be expensive. Moreover, the ADC needs to be performed for each AE, and the number of AEs can be 8, 16, 128, etc. The need for a large number of high-frequency analog-to-digital converters (also called ADCs), can make the use of a digital phased antenna array extremely, and in some cases prohibitively, costly.

SUMMARY

Techniques are described herein that can be used to implement digital phased antenna arrays where the number of the ADCs required need not correspond to the number of AEs in the array, and instead, only a limited number of ADC may be employed. This is achieved in part by applying spreading to the respective antenna response signals, by combining the spreaded response signals into a composite signal, and then by applying the ADC only to the composite signal and not the individual response signals. The signal received at the array can be a wideband signal, e.g., a signal that includes two or more member signals having different polarizations, different frequency bands, and/or different phase-amplitude configurations making the member signals a set of quadrature signals. In this case, the spreading of the individual response signals and/or the combining of the spread signals are performed according to the signal polarizations, frequency bands, and/or phase-amplitude configurations. A respective ADC may be applied to each composite signal and as such, the number of required ADC may equal the number of polarizations, the number of frequency bands, and/or the number of phase-amplitude configurations. Nevertheless, the number of required ADCs does not scale with the number of AEs, and can be significantly less than the number of AEs.

Accordingly, in one aspect, a method is provided for facilitating the detection of a baseband signal. The method includes processing a radio frequency (RF) signal received at a phased antenna array. The received RF signal is processed in several signal processing groups (SPGs). Each signal processing group (SPG) is associated with a respective antenna element (AE) of the phased antenna array. Processing the RF signal within a particular SPG includes receiving the RF signal at the AE corresponding to the SPG. In response to the received RF signal, the AE produces: (i) for a first signal processing chain (SPC) belonging to the particular SPG, a first analog response signal having a first polarization, and (ii) for a second signal processing chain (SPC) belonging to the particular SPG, a second analog response signal having a second polarization.

Thereafter, the first and second analog response signals are processed, respectively, within the first and second SPCs. The processing in the first and second SPCs includes analog spreading using a spreading code that is associated with the particular SPG to which the first and second SPCs belong. Using the spreading code, analog spreading is applied to the first and second analog response signals to provide, respectively, first and second analog spread signals.

The method also includes summing the respective first analog spread signals from each SPG to generate a composite first analog spread signal. In addition, the method includes summing the respective second analog spread signals from each SPG to generate a composite second analog spread signal. The method further includes applying analog-to-digital conversion (ADC) to the first and second composite analog spread signals to generate respective first and second composite digital spread signals.

By processing the first and/or second composite digital spread signals, one or more based band signals can be detected. In particular, de-spreading the first composite digital spread signal using the respective spreading codes corresponding to the several SPGs may yield a number of baseband signals having the first polarization. Likewise, de-spreading the second composite digital spread signal using the respective spreading codes corresponding to the several SPGs may yield a number of baseband signals having the second polarization.

In some embodiments, the first polarization includes left hand circular polarization (LHCP) or horizontal polarization and the second polarization may include right hand circular polarization (RHCP) or vertical polarization. The first polarization may include linear polarization and the second polarization may include circular or elliptical polarization.

In some embodiments, the processing of signals in a particular SPC further includes, prior to the step of applying analog spreading, amplifying and/or filtering the corresponding first and second analog response signals. Additionally or in the alternative, the processing of signals in a particular SPC may include, prior to the step of applying analog spreading, down-converting the corresponding first and second analog response signals into respective first and second intermediate frequency (IF) or baseband analog response signals. The analog spreading may then be applied to the first and second IF or baseband analog response signals.

In some embodiments, the processing of signals in a particular SPC further includes, prior to the step of applying analog spreading, down-converting the corresponding first and second analog response signals into respective first and second intermediate frequency (IF) or baseband analog response signals. In these embodiments, the processing of signals in the particular SPC also includes: (i) filtering the first IF or baseband analog response signal into a first set of IF or baseband narrow-bandwidth signals, and (ii) filtering the second IF or baseband analog response signal into a second set of IF or baseband narrow-bandwidth signals. The analog spreading is respectively applied to each one of the IF or baseband analog response signals in the first set of IF or baseband narrow-bandwidth signals, to yield a first set of narrow-bandwidth spread signals. In addition, the analog spreading is respectively applied to each one of the IF or baseband analog response signals in the second set of IF or baseband narrow-bandwidth signals, to yield a second set of narrow-bandwidth spread signals. In these embodiments, the method also includes summing the first set of narrow-bandwidth spread signals to yield the first analog spread signal, and summing the second set of narrow-bandwidth spread signals to yield the second analog spread signal.

In some embodiments, the method further includes, prior to the ADC, down-converting the first and second composite analog spread signals into respective first and second baseband composite analog spread signals, and applying the ADC to the first and second baseband composite analog spread signals.

In another aspect, a method is provided for facilitating the detection of a baseband signal. The method includes processing a radio frequency (RF) signal received at a phased antenna array. The received RF signal is processed in several signal processing groups (SPGs). Each signal processing group (SPG) is associated with a respective antenna element (AE) of the phased antenna array. The processing of the RF signal within a particular SPG includes receiving the RF signal at the AE corresponding to the SPG. In response to the received RF signal, the AE produces a respective analog response signal corresponding to a pair of signals represented by the received RF signal. The pair of signals includes an in-phase signal and a quadrature signal.

The processing of signals in the particular SPG also includes applying analog spreading to the analog response signal using a pair of spreading codes associated with the particular SPG. A first spreading code in the pair of spreading codes corresponds to the in-phase signal and the second spreading code in the pair of spreading codes corresponds to the quadrature signal. By applying the first and second spreading codes to the analog response signal, in-phase and quadrature analog spread signals are obtained.

The method also includes summing the respective in-phase analog spread signals from each SPG to generate an in-phase composite analog spread signal, and summing the respective quadrature analog spread signals from each SPG to generate a quadrature composite analog spread signal. Thereafter, the method includes applying analog-to-digital conversion (ADC) to each of the in-phase and quadrature composite analog spread signals to generate, respectively, in-phase and quadrature composite digital spread signals.

By processing the in-phase and quadrature composite analog spread signals, one or more based band signals can be detected. In particular, de-spreading the in-phase composite digital spread signal using the respective spreading codes corresponding to the respective SPG may yield one or more in-phase baseband signals. De-spreading the quadrature composite digital spread signal using the respective spreading codes corresponding to the respective SPG may yield one or more quadrature baseband signals.

In some embodiments, the processing the RF signal within a particular SPG further includes, prior to the applying analog spreading, amplifying and/or filtering the corresponding analog response signal. The processing the RF signal within a particular SPG may also include, prior to the step of applying analog spreading, down-converting the corresponding analog response signal into an intermediate frequency (IF) or baseband analog response signal. Thereafter, the analog spreading is applied to the IF or baseband analog response signal.

In some embodiments, the method further includes, prior to the ADC, down-converting the in-phase and quadrature composite analog spread signals into respective in-phase and quadrature baseband composite analog spread signals. The ADC is then applied to each of the in-phase and quadrature baseband composite analog spread signals.

In another aspect, system for radio-frequency (RF) communication includes a phased antenna array having a number of antenna elements (AEs), where a respective signal processing group (SPG) corresponds to each antennal element (AE). The system also includes, for each SPG, a respective receiver mixer that is electrically coupled to the corresponding AE. The receiver mixer is also electrically coupled to a respective encoder that provides a spreading code associated with the SPG to the receiver mixer. In addition, the system includes a signal combiner that is electrically coupled to the respective receiver mixers of each SPG, and an analog-to-digital converter (ADC), that is electrically coupled to the signal combiner.

In some embodiments, the system additionally includes, for each SPG, a respective amplifier that is electrically coupled to the corresponding AE, and a respective filter that is electrically coupled both to the respective amplifier and the respective mixer. The system may include a downconverter that is electrically coupled to the signal combiner, and an amplifier that is electrically coupled to the downconverter. In addition, a filter may be electrically coupled to the amplifier that is coupled to the downconverter and to the ADC.

In some embodiments, the system is also configured for the transmission of signals. To this end, the system may include a digital-to-analog converter (DAC) for receiving a digital baseband signal. In addition, the system may include an up-converter that is electrically coupled to the DAC, and a power divider that is electrically coupled to the up-converter. The system may also include, for each SPG, a respective transmission mixer coupled to the power divider, the respective encoder, and the AE corresponding to the SPG.

In yet another aspect, a system for radio-frequency (RF) communication includes a phased antenna array having a number of antenna elements (AEs), where a respective signal processing group (SPG) corresponds to each antenna element (AE). The system includes, for each SPG, a respective set of signal processing chains, where each signal processing chain (SPC) in the set corresponds to a respective polarization from a number of polarizations. Each SPC may include a respective receiver mixer that is electrically coupled to a respective output of the corresponding AE, where that output corresponds to the polarization corresponding to the SPC. The mixer of a particular SPC is also electrically coupled to a respective encoder that provides to the receiver mixer of the SPC a spreading code associated with the SPG to which the SPC belongs.

The system also includes, for each polarization from the number of polarizations, a respective signal combiner that is electrically coupled to the respective receiver mixers that belong to each SPC and that correspond to the particular polarization, and a respective analog-to-digital converter (ADC) that is electrically coupled to the respective signal combiner.

The above and other preferred features, including various novel details of implementation and combination of operations and/or components, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein. In general, the same or similar references numerals (e.g., where only the alphanumeric suffixes differ) across different figures indicate the same or similar components or operations/functions across such figures, unless noted otherwise.

In the accompanying figures.

Figure 1:
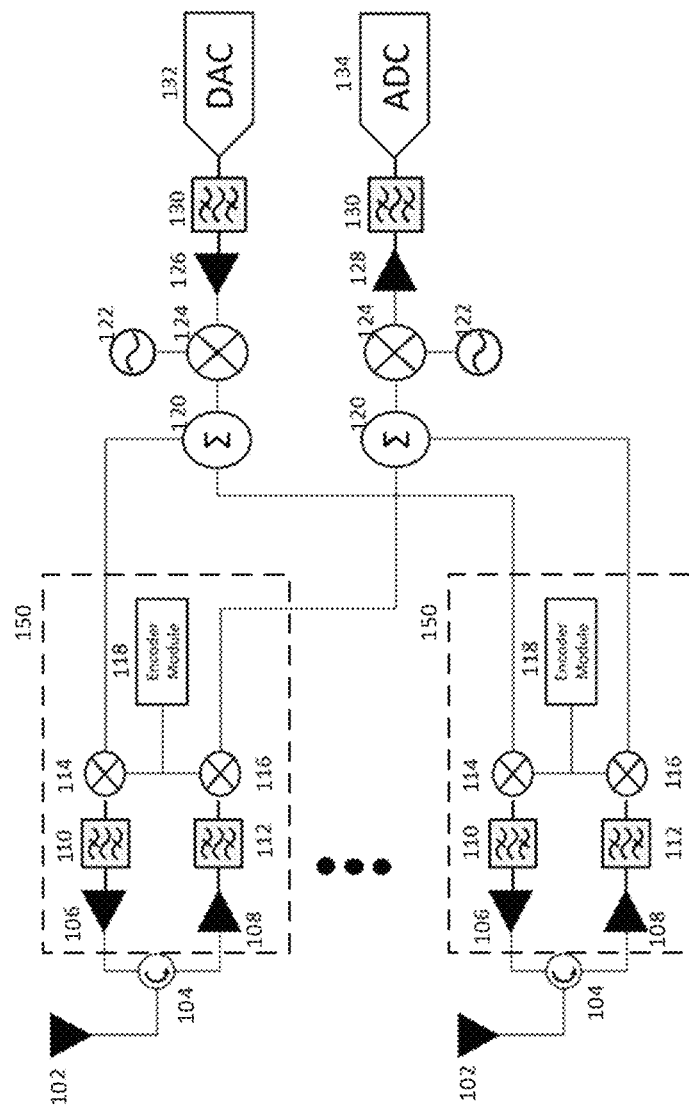
FIG. 1 schematically depicts the generic processing, according to one embodiment, of an RF signal received at or to be transmitted from a phased array antenna.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

FIG. 1 schematically depicts the generic processing of an RF signal received at or to be transmitted from a phased array antenna. The phased array antenna includes a number of antenna elements (AEs) 102. The number of AEs can be 4, 8, 16, 64, hundreds, or thousands. Once a transmitted RF signal is received at the AEs 102, in Step 1, each AE 102 will produce an analog response signal. The respective analog response signals may have different bandwidths and/or polarizations. To this end, each AE 102 may have one or more polarizations and be able to receive signals in one or more frequency bands.

In Step 2, the respective analog response signals pass through respective isolators 104 that can ensure that the response signal generated in response to a received RF signal and the signals to be transmitted do not interfere with each other. This may enable full duplex communications, that is, simultaneous transmission and reception by the same phased antenna array. In Step 3, the respective analog response signals enter respective signal processing groups (SPGs) 150. In each SPG 150, the corresponding analog AE response signal may pass through one or more amplifiers 108. In Step 4, in each SPG 150, the corresponding analog AE response signal may pass through one or more filters 112, e.g., to remove out of band interference or noise.

In Step 5, within each SPG 150, the corresponding analog AE response signal passes through an analog mixer 116 (also called a receiver mixer), where the AE response signal is mixed with a pseudorandom spreading code corresponding to the particular SPG 150 that is generated by the encoding module 118 (also called an encoder) associated with the particular SPG 150. For each SPG 150, a respective unique pseudorandom spreading code may be used. In each SPG 150, the mixer 116 outputs a respective analog spread signal.

In Step 6, the respective analog spread signals from each SPG 150 are summed together using an analog combiner 120, to yield a summed or a composite analog spread signal. In Step 8, the composite analog spread signal is down-converted from the RF range (e.g., several hundred megahertz, a few gigahertz, or even higher frequencies) to the baseband (e.g., a few kilohertz, tens of kilohertz, etc.) using a down-converter that includes one or more mixers 124 and one or more local oscillators 122. The down-converted composite analog baseband signal may be amplified using an amplifier 128, and may be filtered using a filter 130. Thereafter, the optionally amplified and optionally filtered composite baseband signal undergoes analog-to-digital conversion (ADC) via an analog-to-digital converter (also ADC) 134. The ADC 134 outputs a composite digital baseband signal that represents the individual response signals generated by each antenna element. In the processing of the received RF signal described above, regardless of the number of AEs, which can tens, hundreds, thousands, etc., only a single ADC is used.

After the ADC, the composite digital baseband signal may be sent over a high speed link (e.g., a JESD204B link) to a digital signal processor (DSP), e.g., an field programmable gate array (FPGA) processor. Other types of DSPs, such as custom application specific integrated circuit (ASIC), a general processor, a vector processor, a cluster of homogeneous or heterogeneous processors, etc., may be used. Via the processing performed by the DSP, the response signals of each AE 102 may be recovered. To this end, in the DSP, the respective spreading codes used in the respective SPGs 150 (i.e., in the analog domain) are used in the digital domain, where these codes are used to reverse the effect of spreading, i.e., to de-spread the composite digital baseband signal. The de-spreading based on each respective spreading code can yield a respective digital baseband signal corresponding to a respective antenna element 102. The respective spreading codes may be pre-assigned to each antenna element 102, and thus to each SPG 150.

FIG. 1 also schematically depicts the processing that may result in the transmission of an RF signal from the same phased array antenna that may receive and process and RF signal as described above. First, a digital baseband signal is converted into an analog baseband signal using a digital-to-analog converter (DAC) 132. The analog baseband signal is then up-converted from the baseband to RF using an up-converter that includes one or more mixers 124 and one or more local oscillators 122. The up-converted analog RF signal may be optionally amplified using one or more amplifiers 126, and may be filtered using one or more filters 130.

The optionally amplified and/or optionally filtered analog RF signal is passed through a power divider (which may also function as a combiner) 120. The power divider 120 generates several copies of the analog RF signal. Typically, the number of copies is equal to the number of antenna elements 102 in the phased array. Each copy of the analog RF signal then enters a respective SPG 150. Within each SPG 150, the corresponding analog RF signal is de-spread using an analog mixer 114 (also called a transmission mixer) and the pseudorandom code corresponding to the particular SPG 150.

Each de-spread analog RF signal may be filtered using one or more filters 110, e.g., to remove out of band interference and/or noise, and may be amplified using one or more amplifiers 106. The optionally filtered and/or optionally amplified de-spread analog RF signal in each SPG 150 is then phase shifted according to the direction in which an RF signal is to be transmitted. The phase-shifted de-spread analog RF signal in each SPG then passes through the isolator 104 associated with the corresponding AE 102, and is then transmitted via the corresponding AE 102. The combination of the individual phase-shifted de-spread analog RF signals transmitted from each AE 102 forms the RF signal to be transmitted.

Figure 2:
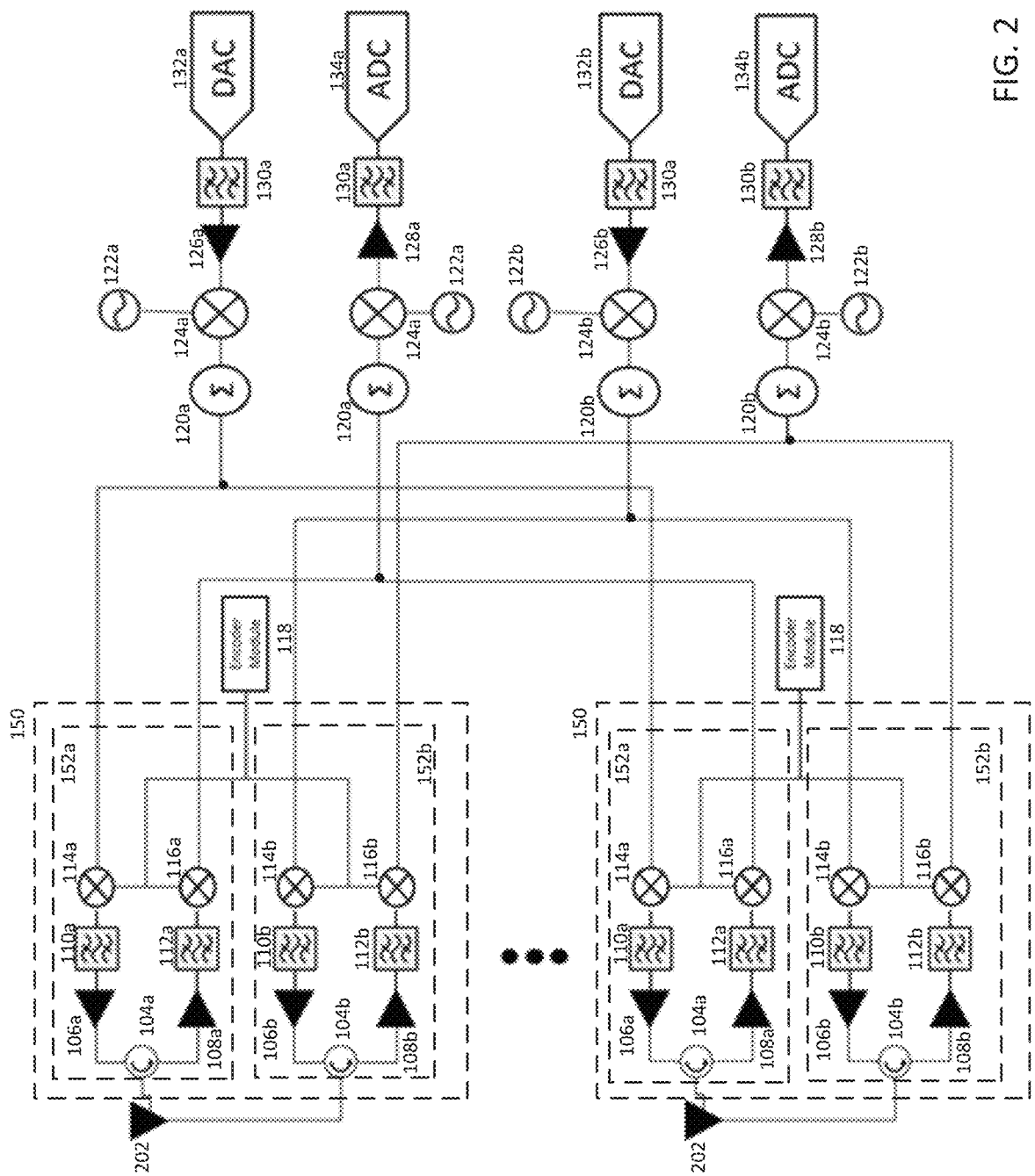
FIG. 2 schematically depicts the processing, according to one embodiment, of an RF signal having two polarizations that is received at or may be transmitted from a phased array antenna.

FIG. 2 schematically depicts the processing of an RF signal having two polarizations that is received at or may be transmitted from a phased array antenna. The components 104*a* through 116*a*, 118, and 120*a* through 134*a* of FIG. 2 are respectively the same as, in terms of their respective functions, the components 102 through 134 of FIG. 1. Likewise, the components 104*b* through 116*b*, 118, and 120*b* through 134*b* of FIG. 2 are also respectively the same as, in terms of their respective functions, the components 102 through 134 of FIG. 1.

In FIG. 2, however, the RF signal received at the phased antenna array includes two RF components each having a different polarization. The polarization of each component can be linear polarization, e.g., horizontal or vertical polarization, circular polarization, e.g., left-hand circular polarization (LHCP), right-hand circular polarization (RHCP), or elliptical polarization, as long as the polarizations of the two components are different. Accordingly, each AE 202 produces two analog RF response signal, one corresponding to a first polarization and another one corresponding to a second polarization. Otherwise, the AEs 202 are similar to the AEs 102 of FIG. 1.

In FIG. 2, similar to FIG. 1, a respective SPG 150 is associated with each AE 202. But, in FIG. 2, each SPG 150 includes two signal processing chains (SPCs) 152*a*, 152*b*. The SPCs 152*a*, 152*b* correspond, respectively, to the two polarizations of the received RF signal. Thus, in SPC 152*a* of the SPG 150, the analog RF response signal corresponding to the first polarization is spread to produce a spread RF signal corresponding to the first polarization. In SPC 152*b* of the SPG 150, the analog RF response signal corresponding to the second polarization is spread to produce another spread RF signal corresponding to the second polarization. Within a particular SPG 150, the code used for each spreading can be the same as long as it is unique to that particular SPG 150. In some embodiments, within a particular SPG 150, the spreading codes used in the SPCs 152*a*, 152*b* can be unique to the respective SPCs, as long as both codes are uniquely associated with that particular SPG 150, as well.

The analog combiner 120*a* sums or combines the respective analog spread signals having the first polarization from each of the SPG 150, to produce a composite analog spread signal having the first polarization. Likewise, the analog combiner 120*b* sums or combines the respective analog spread signals having the second polarization from each of the SPG 150, to produce a composite analog spread signal having the second polarization. The two composite analog spread signals are down-converted into respective analog baseband spread signals, which are then digitized using the respective ADCs 134a, 134b.

The respective composite digital baseband signals, associated with the first and second polarizations, respectively, may be processed further, as described above. Such processing can yield, a set of pairs of digital baseband signals, where the respective pairs in the set correspond to the respective AEs 202. Within each pair, a first digital baseband signal would correspond to the first polarization and the second digital baseband signal would correspond to the second polarization.

While FIG. 2 illustrates the processing of signals having two polarizations, it should be understood that signals having more than 2, e.g., 3 or 4 distinct polarizations may be processed in a similar manner, by duplicating the components 108, 112, 116, 120 (as a combiner), 122, 124, 128, 130, and the ADC 134. In general, for p polarizations, each SPG 150 would include p SPCs, followed by a respective combiner 120, a respective down-converter, and a respective ADC 134, for each polarization. Thus, the processing of the RF signal received by the phased antenna array would require more than one ADCs, but the number of ADCs would nevertheless be limited to the number of distinct polarizations within the received RF signal, and would not scale according to the number of AEs in the phased antenna array.

The transmission of an RF signal according to FIG. 2 is similar to that of FIG. 1, except that two baseband digital signals can be transmitted together, upon conversion thereof into respective analog RF signals having respective distinct polarizations. To that end, the components 106, 110, 114, 120 (as a power divider), 122, 124, 126, 130, and the DAC 132 are duplicated for each polarization. While FIG. 2 illustrates the transmission of signals having two polarizations, it should be understood that simultaneous transmission of signals having more than 2, e.g., 3 or 4 distinct polarizations may be performed in a similar manner, by duplicating the components 106, 110, 114, 120 (as a power divider), 122, 124, 126, 130, and the DAC 132.

Figure 3:
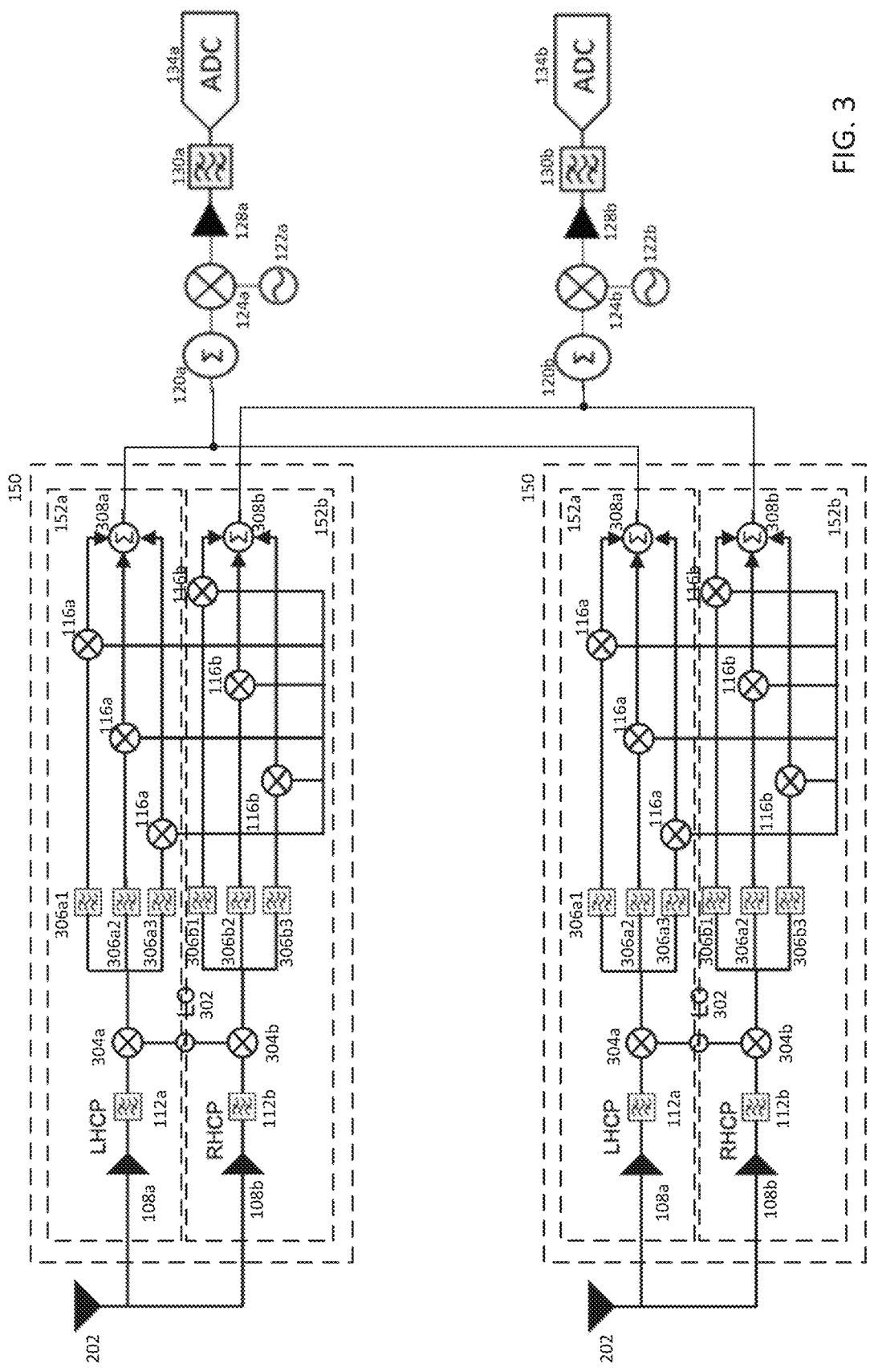
FIG. 3 schematically depicts the processing, according to one embodiment, of a wideband or multiband RF signal having two polarizations, that is received at a phased array antenna.

FIG. 3 schematically depicts the processing of a wideband or multiband RF signal (i.e., having a bandwidth of tens or hundreds of kilohertz, a few megahertz, or hundreds of megahertz), and having two polarizations, that is received at a phased array antenna. The components 202, 108a, 108b, 112a, 112b, 120a, 120b (both as signal combiners), 122a, 122b, 124a, 124b, 128a, 128b, 130a, 130b, and the ADCs 134a, 134b are respectively the same as, in terms of their respective functions, the corresponding components of FIG. 2. In FIG. 3, however, the received RF signal, and the respective RF response signals generated by the respective AEs 202 are wideband or multiband signals. In particular, in FIG. 3, each of the RF response signal includes three bands, having three non-overlapping frequency ranges.

Additionally in FIG. 3, within each of the SPCs 152a, 152b, before the respective spreading operations, the respective RF response signals are down-converted from RF to an intermediate frequency (IF) using respective downconverters. In the SPC 152a, the downconverter includes a mixer 304a and in the SPC 152b, the downconverter includes a mixer 204b. The downconverters in each of the SPCs 152a, 152b can share a local oscillator 302 providing the selected center IF for the down-conversion. In some embodiments, instead of the down-conversion to the IF, the respective RF response signals may be down-converted from RF to the baseband.

Within each SPG 150, within the respective SPC 152a, the down-converted IF or baseband response signal is passed through three band filters 306a1, 306a2, and 306a2, which output, respectively, the three narrow-bandwidth (e.g., less than a few kilohertz, a few tens of kilohertz, or a few megahertz) components or bands of the down-converted IF or baseband response signal. Each of these components or bands is then spread using the mixers 116a, as described above with reference to FIG. 2. The three respective spread signals produced by the mixers 116a are combined or summed using a combiner 308a, to produce an analog spread signal corresponding to the respective SPC 152a.

This analog spread signal is processed further, via the combiner 120a, the down-converter that includes the local oscillator 122a and the mixer 124a, the optional amplifier 128a, the optional filter 130a, and the ADC 134a, as described above with reference to FIG. 2. If the upstream downconverter having the local oscillator 302 and the mixer 304a provides down-conversion to IF, the subsequent downconverter, having the local oscillator 122a and the mixer 124a, may provide down-conversion not from RF to baseband (as in FIG. 2) but from IF to baseband. If the upstream downconverter having the local oscillator 302 and the mixer 304a provides down-conversion to baseband, the subsequent downconverter, having the local oscillator 122a and the mixer 124a, would be omitted.

Within each SPG 150, within the respective SPC 152b, the down-converted IF or baseband response signal is processed in a similar manner, using three band filters 306b1, 306b2, and 306b2, and the mixers 116b. The three respective spread signals produced by the mixers 116b are combined or summed using a combiner 308b, to produce an analog spread signal corresponding to the respective SPC 152b. This analog spread signal is processed further, via the combiner 120b, the down-converter that includes the local oscillator 122b and the mixer 124b, the optional amplifier 128b, the optional filter 130b, and the ADC 134b, as described above with reference to FIG. 2. Here again, the down-converter that includes the local oscillator 122b and the mixer 124b may provide IF to baseband down-conversion, or may be omitted, as described above.

The respective digital baseband composite signals provided by the ADCs 134a, 134b may be processed further, as described with reference to FIGS. 1 and 2, to obtain digital baseband signals components corresponding to the individual bands of the received wideband or multiband RF signal. It should be understood that while FIG. 3 illustrates three bands associated the received RF signals, other embodiments may feature processing for only 2 or more than three, e.g., 4, 8, etc. bands.

In some embodiments, an unpolarized wideband or multiband RF signal may be received at a phased array antenna. In such embodiments, the processing is generally the same as that described above with reference to FIG. 3, except that each SPG 150 includes only one SPC similar to the SPC 152a (or 152b). The combiner 120a and the ADC 134a, and the optional components 122a, 124a, 128a, and 130a, if used, are not duplicated either, because polarization-specific ADC is not needed. Instead, only one instance of these components is used, e.g., as described with reference to FIG. 1.

Figure 4:
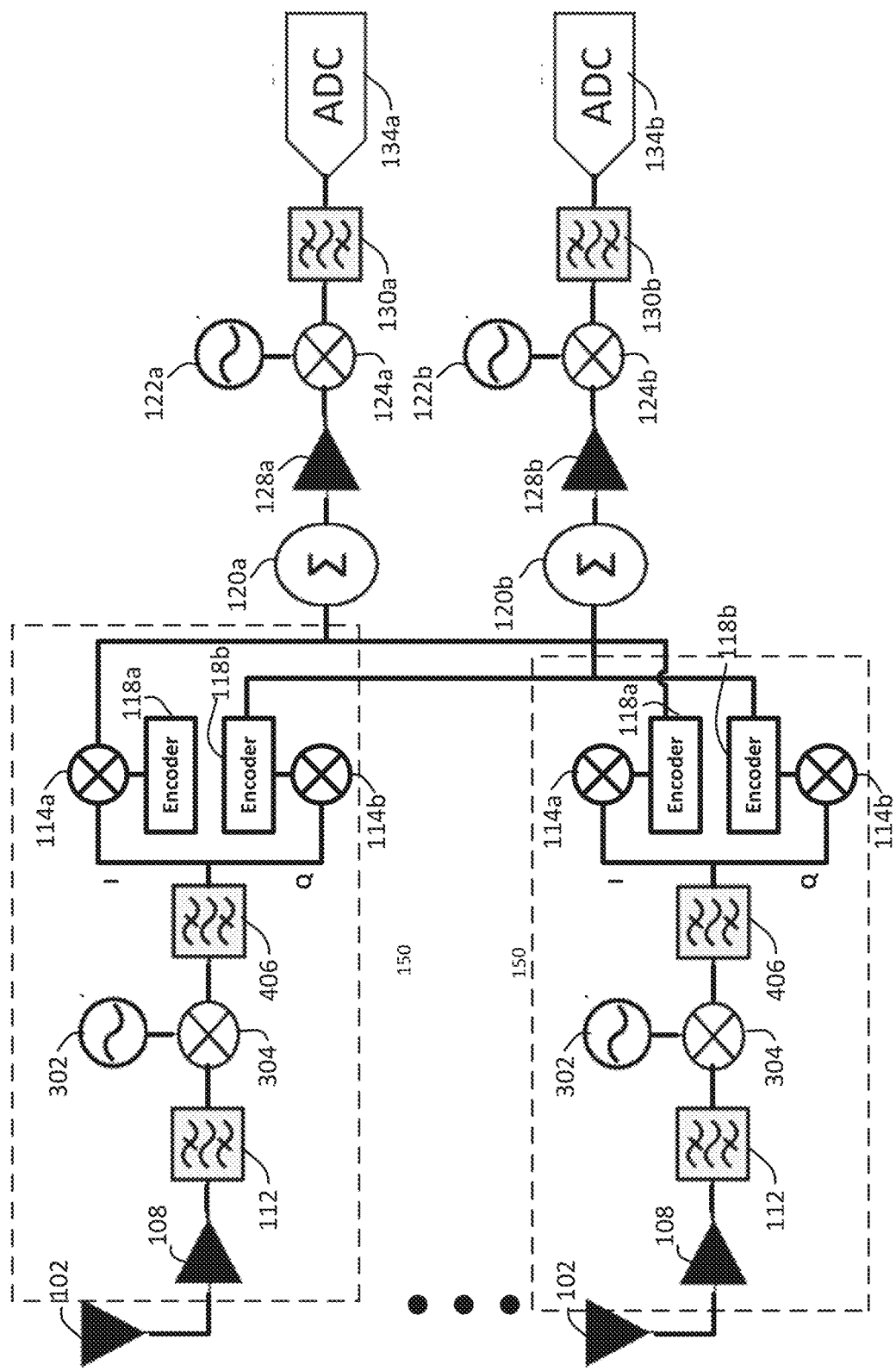
FIG. 4 schematically depicts, according to one embodiment, the processing of an RF signal that is received at a phased array antenna and that includes an in-phase component and a quadrature component.

FIG. 4 schematically depicts the processing of an RF signal that is received at a phased array antenna and that includes an in-phase component and a quadrature component. The components 102, 108, 112, 120a, 120b (both as signal combiners), 122a, 122b, 124a, 124b, 128a, 128b, 130a, 130b, and the ADCs 134a, 134b are respectively the same as, in terms of their respective functions, the corresponding components of FIGS. 1 and 2. The upstream downconverters in each SPG 150, having the corresponding local oscillator 302 and the corresponding mixer 304, are also the same as, in terms of their respective functions, the corresponding downconverters of FIG. 3.

In FIG. 4, because the received RF signal includes an in-phase and a quadrature component, the respective RF response signal produced by each AE 102 also includes respective in-phase and quadrature components. Within a particular SPG 150, the encoders 118a and 118b are similar to the encoder module 118 of FIG. 1, but the encoder 118a provides a spreading code that corresponds to the in-phase component of the received RF signal, and that is unique to the particular SPG 150. Likewise, the encoder 118b provides a spreading code that corresponds to the quadrature component of the received RF signal, and that is unique to the particular SPG 150. The mixers 114a, 114b spread the corresponding RF response signal to produce in-phase and quadrature spread signals.

The respective in-phase spread signals from each SPG 150 are summed or combined by the signal combiner 120a to produce an analog in-phase composite spread signal. The respective quadrature spread signals from each SPG 150 are summed or combined by the signal combiner 120b to produce an analog quadrature composite spread signal. The analog in-phase and quadrature composite spread signals are then digitized using the ADC 134a, 134b, respectively. The resulting digital baseband composite spread signals are processed further, as described with reference to FIGS. 1 and 2, to obtain digital baseband in-phase and quadrature components of the received RF signal.

Figure 5:
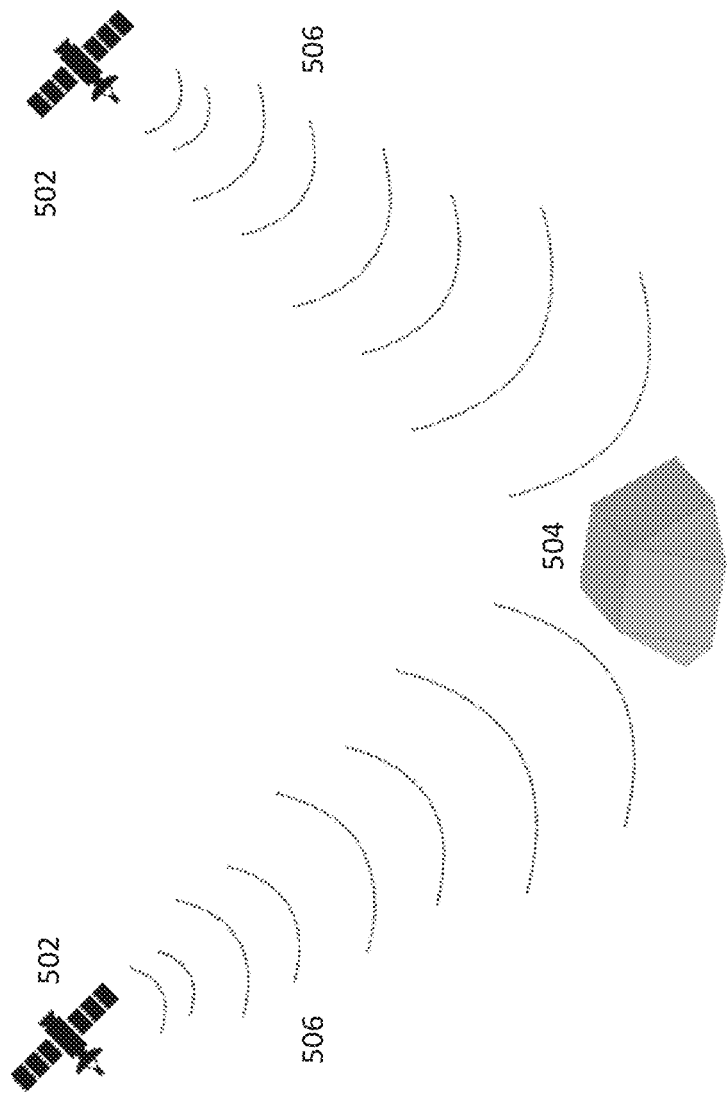
FIG. 5 schematically depicts a communication system that may employ the processing described with reference to FIGS. 1-4.

FIGS. 1-4 describe different kinds of RF signals, such as those having components that have different polarizations, components that have distinct bands, and/or in-phase and quadrature components. Such signals can be transmitted to/from satellites from/to ground-based stations having phased antenna arrays. The ground-based stations can be stationary or mobile. FIG. 5 schematically depicts such a communication system having satellites 502, and a phased antenna array 504 that can transmit and/or receive RF signals in different directions, such as signals 506, 508. The different kinds of RF signals described with reference to FIGS. 1 and 4 are not limited to satellite communications, however, and can be exchanged between two or more ground-based stations, submarine stations, etc.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims. Accordingly, other implementations are within the scope of the following claims. The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated. The terms "substantially", and "significantly", and other similar phrases, as used in the specification and the claims (e.g., "a significant portion of X"), should be understood to mean that more than 95%, 90%, 80%, 60% or more than 50% of X.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

As various changes could be made in the above constructions without departing from the scope of the invention, it is intended that all the matter contained in the above description or shown in the accompanying drawings shall be interpreted as illustrative and not in a limiting sense.

What is claimed is:

1. A method for facilitating detection of a baseband signal, the method comprising:
   processing a radio frequency signal in a plurality of signal processing groups, wherein each signal processing group, of the plurality of signal processing groups, is associated with a respective antenna element of a phased antenna array, wherein processing the radio frequency signal within each particular signal processing group comprises:
      receiving the radio frequency signal at the antenna element corresponding to the signal processing group, wherein in response to the received radio frequency signal the antenna element produces:
         for a first signal processing chain belonging to each signal processing group, a first analog response signal having a first polarization; and
         for a second signal processing chain belonging to each signal processing group, a second analog response signal having a second polarization; and
      processing the first analog response signal and the second analog response signal respectively within the first and second signal processing chains comprising:
         down-converting a corresponding first analog response signal into a first intermediate frequency or baseband analog response signal;
         down-converting a corresponding second analog response signal into a second intermediate frequency or baseband analog response signal;
         filtering:
            the first intermediate frequency or baseband analog response signal into a first plurality of intermediate frequency or baseband narrow-bandwidth signals; and
            the second intermediate frequency or baseband analog response signal into a second plurality of intermediate frequency or baseband narrow-bandwidth signals;
         using a spreading code associated with each signal processing group to which the first and second signal processing chains belong, applying analog spreading to the first analog response signal and the second analog response signal to provide, respectively, first analog spread signals and second analog spread signals;
         wherein the analog spreading is respectively applied:
            to each one of the intermediate frequency or baseband analog response signals in the first plurality of intermediate frequency or baseband narrow-bandwidth signals to yield a first plurality of narrow-bandwidth spread signals; and
            to each one of the intermediate frequency or baseband analog response signals in the second plurality of intermediate frequency or baseband narrow-bandwidth signals to yield a second plurality of narrow-bandwidth spread signals;
         summing the first plurality of narrow-bandwidth spread signals to yield the first analog spread signals; and
   summing the second plurality of narrow-bandwidth spread signals to yield the second analog spread signals;
   summing the first analog spread signals from each signal processing group to generate a composite first analog spread signal;
   summing the second analog spread signals from each signal processing group to generate a composite second analog spread signal; and
   applying analog-to-digital conversion to the first composite analog spread signal and the second composite analog spread signal to generate a first composite digital spread signal and a second composite digital spread signal, whereby:
      de-spreading the first composite digital spread signal using the respective spreading codes corresponding to the plurality of signal processing groups yields a plurality of baseband signals having the first polarization; and
      de-spreading the second composite digital spread signal using the respective spreading codes corresponding to the plurality of signal processing groups yields a plurality of baseband signals having the second polarization.

2. The method of claim 1, where in the first polarization comprises left hand circular polarization or horizontal polarization and the second polarization comprises right hand circular polarization or vertical polarization.

3. The method of claim 1, wherein the first polarization comprises linear polarization and the second polarization comprises circular or elliptical polarization.

4. The method of claim 1, wherein the processing in the first and second signal processing chains further comprises:
   prior to the applying analog spreading, amplifying and filtering the corresponding first analog response signal and the second analog response signal.

5. The method of claim 1, further comprising:
   prior to the analog-to-digital conversion, down-converting the first composite analog spread signal and the second composite analog spread signal into a first baseband composite analog spread signal and a second baseband composite analog spread signal; and applying the analog-to-digital conversion to the first baseband composite analog spread signal and the second baseband composite analog spread signal.

\* \* \* \* \*